3,074,990
Patented Jan. 22, 1963

3,074,990
ALKYLTHIOPHOSPHORIC ACID SALT OF POLYMERIC CONDENSATION PRODUCT AND USE THEREOF
Henry A. Cyba, Chicago, Ill., assignor, by mesne assignments, to Universal Oil Products Company, Des Plaines, Ill., a corporation of Delaware
No Drawing. Filed Dec. 29, 1958, Ser. No. 783,156
8 Claims. (Cl. 260—461)

This invention relates to a new class of organic alkylthiophosphoric acid compounds and to the use thereof. More particularly the invention relates to alkylthiophosphoric salts of a polymeric condensation product containing a tertiary nitrogen atom.

In one embodiment the present invention relates to an alkylthiophosphoric acid salt formed by the addition reaction thereof to a tertiary nitrogen atom of a condensation product containing said tertiary atom and comprising a polymeric reaction product.

In another embodiment the present invention relates to the use of these compounds as additives in hydrocarbon oils and particularly lubricating oils.

As will be hereinafter set forth in detail, it is essential that the condensation product is a polymeric reaction product containing a tertiary nitrogen atom. This polymeric condensation product may be formed in any suitable manner, a number of preferred embodiments being set forth below.

In one embodiment the polymeric condensation product containing a tertiary nitrogen atom is prepared by condensing a dialkanol amine with a polycarboxylic acid. Preferred dialkanol amines include N-aliphatic-dialkanol amines in which the aliphatic group attached to the nitrogen atom contains from one to about fifty carbon atoms and preferably about twelve to about twenty-two carbon atoms. The alkanol groups preferably contain from about two to about four carbon atoms each, although it is understood that they may contain up to about twenty carbon atoms each. Preferably the N-aliphatic-dialkanol amine is an N-alkyldiethanol amine. Illustrative compounds include N-methyl-diethanolamine, N-ethyl-diethanolamine, N-propyl-diethanolamine, N-butyl-diethanolamine, N-amyl-diethanolamine, N-hexyl-diethanolamine, N-heptyl-diethanolamine, N-octyl-diethanolamine, N-nonyl-diethanolamine, N-decyl-diethanolamine, N-undecyl diethanolamine, N-dodecyl-diethanolamine, N-tridecyl-diethanolamine, N-tetradecyl-diethanolamine, N-pentadecyl-diethano amine, N-hexadecyl-diethanolamine, N-heptadecyl-diethanolamine, N-octadecyl-diethanolamine, N-nonadecyl-diethanolamine, N-eicosyl-diethanolamine, N-N-heneicosyl-diethanolamine, N-docosyl-diethanolamine, N-tricosyl-diethanolamine, N-tetracosyl-diethanolamine, N-pentacosyl-diethanolamine, N - hexacosyl - diethanolamine, N heptacosyl-diethanolamine, N-octacosyl-diethanolamine, N-nonacosyl-diethanolamine, N-triacontyl-diethanolamine, N-hentriacontyl-diethanolamine, N-dotriacontyl-diethanolamine, N-tritriacontyl-diethanolamine, N-tetratriacontyl-diethanolamine, N-pentatriacontyl-diethanolamine, N hexatriacontyl-diethanolamine, N-heptatriacontyl-diethanolamine, N-octatriacontyl-diethanolamine, N-nonatriacontyl-diethanolamine, N-tetracontyl-diethanolamine, N-hentetracontyl-diethanolamine, N-dotetracontyl-diethanolamine, N-tritetracontyl-diethanolamine, N-tetratetracontyl-diethanolamine, N pentatetracontyl-diethanolamine, N-hexatetracontyl-diethanolamine, N-heptatetracontyl diethanolamine, N-octatetracontyl-diethanolamine, N-nonatetracontyl-diethanolamine, N-pentacontyl-diethanolamine, etc. In some cases, N-alkenyl-diethanolamines may be utilized. Illustrative N-alkenyl-diethanolamines include N-hexenyl-diethanolamine, N-heptenyl-diethanolamine, N-octenyl-diethanolamine, N-nonenyl-diethanolamine, N-decenyl-diethanolamine, N-undecenyl-diethanolamine, N-dodecenyl-diethanolamine, N-tridecenyl-diethanolamine, N-tetradecenyl-diethanolamine, N-pentadecenyl-diethanolamine, N-hexadecenyl-diethanolamine, N-heptadecenyl-diethanolamine, N-octadecenyl diethanolamine, N-nonadecenyl-diethanolamine, N-eicosenyl-diethanolamine, etc.

It is understood that the N-aliphatic-diethanolamines may contain aliphatic substituents attached to one or both of the carbon atoms forming the ethanol groups. These compounds may be illustrated by N-aliphatic-di-(1-methylethanolamine), N-aliphatic-di-(1-ethylethanolamine), N-aliphatic-di-(1-propylethanolamine), N - aliphatic - di - (1 - butylethanolamine), N-aliphatic-di-(1-amylethanolamine), N-aliphatic-di-(1-hexylethanolamine), etc., N-aliphatic-di-(2-methylethanolamine), N-aliphatic-di-(2-ethylethanolamine), N - aliphatic - di - (2-propylethanolamine), N-aliphatic-di-(2-butylethanolamine), N-aliphatic-di-(2-amylethanolamine), N-aliphatic-di-(2-hexylethanolamine), etc. It is understood that these specific compounds are illustrative only and that other suitable compounds containing the diethanolamine configuration may be employed.

The specific compounds hereinbefore set forth are examples of N-aliphatic-diethanolamines. Other N-aliphatic-dialkanolamines include N-aliphatic-dipropanolamines and N-aliphatic-dibutanolamines, although N-aliphatic-dipentanolamines, N-aliphatic-dihexanolamines and higher dilkanolamines may be used in some cases. It is understood that these dialkanolamines may be substituted in a manner similar to that specifically described hereinbefore in connection with the discussion of the diethanolamines. Furthermore, it is understood that mixtures of N-aliphatic-dialkanolamines may be employed, preferably being selected from those hereinbefore set forth. Also, it is understood that the various diakanolamines are not necessarily equivalent.

A number of N-alkyl-diethanolamines are available commercially and are advantageously used in preparing the condensation product. For example, N-tallow-diethanolamine is available under the trade name of "Ethomeen T/12." This material is a gel at room temperature, has an average molecular weight of 354 nad a specific gravity at 25°/25° C. of 0.916. The alkyl substituents contain from about twelve to twenty carbon atoms per group and mostly sixteen to eighteen carbon atoms. Another mixed product is available commercially under the trade name of "Ethomeen S/12" and is N-soya-diethanolamine. It is a gel at room temperature, has an average molecular weight of 367 and a specific gravity at 25°/25° C. of 0.911. The alkyl substituents contain 16–18 carbon atoms per group. Still another commercial product is "Ethomeen C/12," which is N-coco-diethanolamine, and is a liquid at room temperature, and has an average molecular weight of 303 and a specific gravity at 25°/25° C. of 0.874. The alkyl groups contain mostly twelve carbon atoms per group, although it also contains groups having from eight to sixteen carbon atoms per group. Still another commercially available product is N-stearyl-diethanolamine, which is marketed under the traed name of "Ethomeen 18/12." This product is a solid at room temperature, has an average molecular weight of 372 and a specific gravity at 25°/25° C. of 0.959. It contains eighteen carbon atoms in the alkyl substituent.

The N-aliphatic-dialkanolamine is reacted with a polycarboxylic acid. The polycarboxylic acid preferably comprises an aliphatic dicarboxylic acid. Illustrative dicarboxylic acids include oxalic, malonic, succinic, glutaric, adipic, pimelic, suberic, azelaic, sebacic, maleic, fumaric, itaconic, citraconic, mesaconic, etc. While the dicarboxylic acids are preferred, it is understood that polycarboxylic acids containing three, four, or more carboxylic acid groups may be employed. Furthermore, it is understood that a mixture of polycarboxylic acids and particularly of dicarboxylic acids may be used. A number of relatively inexpensive dicarboxylic acids comprising a mixture of these acids are marketed commercially under various trade names, including "VR-1 Acid," "Dimer Acid," "Empol 1022", etc., and these acids may be used in accordance with the present invention. For example, "VR-1 Acid" is a mixture of dicarboxylic acids and has an average molecular weight of about 700, is a liquid at 77° F., has an acid number of about 150 and an iodine number of about 36. It contains thirty-six carbon atoms per molecule.

Another preferred polycarboxylic acid comprises a mixed acid being marketed commercially under the trade name of "Empol 1022." This dimer acid is a dilinoleic acid and is repersented by the following general formula:

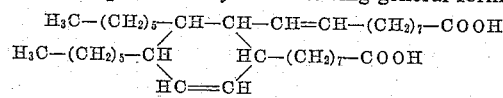

This acid is a viscous liquid, having an apparent molecular weight of approximately 600. It has an acid value of 180–192, an iodine value of 80–95, a saponification value of 185–195, a neutralization equivalent of 290–310, a refractive index at 25° C. of 1.4919, a specific gravity at 15.5° C./15.5° C. of 0.95, a flash point of 530° F., a fire point of 600° F., and a viscosity at 100° C. of 100 centistokes. The above-mentioned "Dimer Acid" is substantially the same as "Empol 1022."

While the polycarboxylic acid may be employed, advantages appear to be obtained in some cases when using anhydrides thereof and particularly alkenyl-acid anhydrides. A preferred alkenylacid anhydride is dodecenyl-succinic anhydride. Other alkenylacid anhydrides include butenyl-succinic anhydride, pentenyl-succinic anhydride, hexenyl-succinic anhydride, heptenyl-succinic anhydride, octenyl-succinic anhydride, nonenyl-succinic anhydride, decenyl-succinic anhydride, undecenyl-succinic anhydride, tridecenyl-succinic anhydride, tetradecenyl-succinic anhydride, pentadecenyl-succinic anhydride, hexadecenyl-succinic anhydride, heptadecenyl-succinic anhydride, octadecenyl-succinic anhydride, nonadecenyl-succinic anhydride, eicosenyl-succinic anhydride, etc. While the alkenyl-succinic anhydrides are preferred, it is understood that the alkyl-succinic anhydrides may be employed, the alkyl groups preferably corresponding to the alkenyl groups hereinbefore specifically set forth. Similarly, while the aliphatic succinic anhydrides are preferred, it is understood that the anhydrides and particularly aliphatic-substituted anhydrides of other acids may be employed including, for example, adipic anhydride and particularly aliphatic adipic anhydrides, glutaric anhydride and particularly aliphatic glutaric anhydrides, etc.

It is understood that the aliphatic substituents attached to the N-aliphatic-dialkanolamine and/or the polycarboxylic caid or anhydride may be either of straight chain or branched chain configuration. Likewise, these aliphatic groups may be substituted by non-hydrocarbon groups including those containing nitrogen, oxygen, halogen and particularly chlorine and bromine, etc.

The condensation of N-aliphatic-dialkanolamine and polycarboxylic acid or anhydride is effected in any suitable manner but will comprise the interhydroxyl reaction, with the liberation of water, and the production of a polymeric compound containing a tertiary nitrogen atom. The reaction generally is effected at a temperature above about 175° F. and preferably at a higher temperature, which usually will not exceed about 400° F., although higher or lower temperatures may be employed under certain conditions. The exact temperature will depend upon whether a solvent is used and, when employed, on the particular solvent. For example, with benzene as the solvent, the temperature will be of the order of 175° F., with toluene the temperature will be of the order of 250° F., and with xylene the order of 300–320° F. Other preferred solvents include cumene, naphtha, decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the reaction product at an elevated temperature, etc. A higher temperature may be utilized in order to remove the water as it is being fromed. The time of reaction is sufficient to effect polymer formation and, in general, will range from about six to about forty hours or more. Preferably one or two mole proportions of N-aliphatic-dialkanolamine are reacted with one mole proportion of acid.

In another embodiment the condensation product containing a tertiary nitrogen atom is obtained by reacting an epihalohydrin compound with an amine compound. A preferred epihalohydrin compound is epichlorohydrin. Other epihalohydrin compounds include 1,2-epi-4-chlorobutane, 2,3-epi-4-chlorobutane, 1,2-epi-5-chloropentane, 2,3-epi-5-chloropentane, etc. While the chloro derivatives are preferred, it is understood that the corresponding bromo and iodo compounds may be employed.

One mole proportion of the epihalohydrin compound is reacted with one mole proportion of a suitable amine. Preferred amines include primary alkyl amines and preferably those containing from about twelve to about forty carbon atoms per molecule. Illustrative primary alkyl amines include dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, hentriacontyl amine, dotriacontyl amine, tritriacontyl amine, tetratriacontyl amine, pentatriacontyl amine, hexatriacontyl amine, heptatriacontyl amine, octatriacontyl amine, nonatriacontyl amine, tetracontyl amine, etc. Conveniently the long chain amines are prepared from fatty acids or more particularly from mixtures of fatty acids formed as products or by-products. Such mixtures are available commercially, generally at lower prices and, as another advantage of the present invention, the mixtures may be used without the necessity of separating indiviual amines in pure state.

An example of such a mixture is hydrogenated tallow amine which is available under various trade names including "Alamine H26D" and "Armeen HTD." These products comprise mixtures predominating in alkyl amines containing sixteen to eighteen carbon atoms per alkyl group, although they contain a small amount of alkyl groups having fourteen carbon atoms.

Illustrative examples of secondary amines, which may be reacted with the epihalohydrin compound, include di-(dodecyl) amine, di-(tridecyl) amine, di-(tetradecyl) amine, di-(pentadecyl) amine, di-(hexadecyl) amine, di-(heptadecyl) amine, di-(octadecyl) amine, di-(nonadecyl) amine, di-(eicosyl) amine, etc. In another embodiment, which is not necessarily equivalent, the secondary amine will contain one alkyl group having at least twelve carbon atoms and another alkyl group having less than twelve carbon atoms. Illustrative examples of such compounds include N-propyl-dodecyl amine, N-butyl-dodecyl amine, N-amyl-dodecyl amine, N-butyl-tridecyl amine, N-amyl-tridecyl amine, etc. Here again, mixtures of secondary amines are available commercially, usually at a lower price, and such mixtures may be used in accordance with the present invention. An example of such a mixture available commercially is "Armeen 2HT" which consists primarily of dioctadecyl amine and dihexadecyl amine.

Preferred examples of N-alkyl polyamines, which may be reacted with the epihalohydrin compound, comprise N-alkyl-1,3-diaminopropanes in which the alkyl group contains at least twelve carbon atoms. Illustrative examples include N-dodecyl-1,3-diaminopropane, N-tridecyl-1,3-diaminopropane, N-tetradecyl-1,3-diaminopropane, N-pentadecyl-1,3-diaminopropane, N-hexadecyl-1,3-diaminopropane, N-heptadecyl-1,3-diaminopropane, N-octadecyl-1,3-diaminopropane, N-nonadecyl-1,3-diaminopropane, N-eicosyl-1,3-diaminopropane, N-heneicosyl-1,3-diaminopropane, N-docosyl-1,3-diaminopropane, N-tricosyl-1,3-diaminopropane, N-tetracosyl-1,3-diaminopropane, N-pentacosyl-1,3-diaminopropane, etc. As before, mixtures are available commercially, usually at lower prices, of suitable compounds in this class and advantageously are used for the purposes of the present invention. One such mixture is "Duomeen T" which is N-tallow-1,3-diaminopropane and predominates in alkyl groups containing sixteen to eighteen carbon atoms each, although the mixture contains a small amount of alkyl groups containing fourteen carbon atoms each. Another mixture available commercially is N-coco-1,3-diaminopropane which contains alkyl groups predominating in twelve to fourteen carbon atoms each. Still another example is N-soya-1,3-diaminopropane which predominates in alkyl groups containing eighteen carbon atoms per group, although it contains a small amount of alkyl groups having sixteen carbon atoms. It is understood that corresponding N-alkyl diaminobutanes, N-alkyl diaminopentanes, N-alkyl diaminohexanes, etc. may be employed. In still another embodiment two different amines may be reacted with the epihalohydrin compound, the second amine being selected from those hereinbefore set forth or comprising alkylene polyamines including ethylene diamine, diethylene triamine, triethylene tetramine, tetraethylene pentamine, etc., similar propylene and polypropylene polyamines, butylene and polybutylene polyamines, etc.

The epihalohydrin and amine are reacted in any suitable manner. In a preferred embodiment, the reactants are prepared as solutions in suitable solvents, particularly alcohols such as ethanol, propanol, butanol, etc., and one of the solutions added gradually, with stirring, to the other solution, and reacted at a temperature of from about 20° to about 100° C. and preferably 50° to about 100° C., and for a sufficient time to effect polymer formation, which generally will range from about two and preferably from about four to twenty-four hours or more.

Another example of a polymeric condensation product containing a tertiary nitrogen atom is formed by the reaction of (1) an unsaturated compound having a polymerizable ethylenic linkage and (2) an unsaturated compound having a polymerizable ethylenic linkage and a basic nitrogen. Examples of the first mentioned unsaturated compound include saturated and unsaturated long chain esters of unsaturated carboxylic acids such as 2-ethylhexyl acrylate, nonyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, etc., and particularly methacrylates including n-octyl methacrylate, n-nonyl methacrylate, 3,5,5-trimethylhexyl methacrylate, n-decyl methacrylate, sec-capryl methacrylate, lauryl methacrylate, dodecyl methacrylate, tridecyl methacrylate, tetradecyl methacrylate, pentadecyl methacrylate, hexadecyl methacrylate, cetyl methacrylate, heptadecyl methacrylate, octadecyl methacrylate, 9-octadecenyl methacrylate, etc.; unsaturated esters of long-chain carboxylic acids such as vinyl laurate, vinyl stearate; long-chain esters of vinylene dicarboxylic acids such as methyl lauryl fumarate; N-long-chain hydrocarbon substituted amides of unsaturated acids such as N-octadecyl acrylamide; long-chain monoolefins such as the alkyl or acyl substituted styrenes as, for example, dodecylstyrene, and the like. A particularly preferred compound is lauryl methacrylate and more particularly technical lauryl methacrylate which is obtained by esterification of a commercial mixture of long-chain alcohols in the $C_{10}$ to $C_{18}$ range derived from coconut oil. The technical lauryl methacrylate is available commercially at a lower price and, accordingly, is preferred. A typical technical lauryl methacrylate will contain in the ester portion carbon chain lengths of approximately 3% $C_{10}$, 61% $C_{12}$, 23% $C_{14}$, 11% $C_{16}$, and 2% $C_{18}$.

Examples of the second mentioned unsaturated compounds (those containing a basic amino nitrogen) include p-(beta-diethylaminoethyl)-styrene; basic nitrogen-containing heterocycles carrying a polymerizable ethylenically unsaturated substituent such as the vinyl pyridines and the vinyl alkyl pyridines as, for example, 2-vinyl-5-ethyl pyridine; esters of basic amino alcohols with unsaturated carboxylic acids such as the alkyl and cycloalkyl substituted aminoalkyl and amino cycloalkyl esters of the acrylic and alkacrylic acids as, for example, beta-methylaminoethyl acrylate, beta-diethylaminoethyl methacrylate, beta-beta-didodecylaminoethyl acrylate, etc.; unsaturated ethers of basic amino alcohols such as the vinyl ethers of such alcohols as, for example, beta-aminoethyl vinyl ether, beta-diethylaminoethyl vinyl ether, etc.; amides of unsaturated carboxylic acids wherein a basic amino substituent is carried on the amide nitrogen such as N-(beta-dimethylaminoethyl)-acrylamide; polymerizable unsaturated basic amines such as diallylamine, and the like. In this specification and claims the term "basic amino nitrogen" is used in the generic sense to cover the primary, secondary and tertiary amines including, as stated above, the basic nitrogen-containing heterocycles.

The copolymer is prepared in any suitable manner and generally by heating the reactants at a temperature of from about 100° to about 175° F. for a period of time ranging from two to forty-eight hours or more, preferably in the presence of a catalyst or initiator such as benzoyl peroxide, tertiary butyl peroxide, azo compounds as alpha, alpha'-azo-diisobutyronitrile, etc. When desired, the polymerization may be effected in the presence of a solvent and particularly aromatic hydrocarbons as hereinbefore set forth.

The above condensation products are examples of suitable polymeric condensation products containing a tertiary nitrogen atom. It is understood that any other suitable condensation product containing a tertiary nitrogen atom may be reacted with an alkylthiophosphoric acid to form the novel salt of the present invention.

Any suitable alkylthiophosphoric acid may be utilized in preparing the novel reaction product of the present invention. Illustrative alkylthiophosphoric acids include dialkyl dithiophosphoric acids, monoalkyl dithiophosphoric acids, dialkyl monothiophosphoric acids, monoalkyl monothiophosphoric acids, dialkylaryl dithiophosphoric acids, dialkylaryl monothiophosphoric acids, tetraalkyl diaryl monothiophosphoric acids, tetraalkyl diaryl dithiophosphoric acids, etc. The dialkyl dithiophosphoric acids are preferred for use in the present invention, and these are readily prepared by the reaction of phosphorus pentasulfide with suitable alcohols or phenols. The reaction of phosphorus pentasulfide with an alcohol is described in detail in the prior art and need not be repeated in the present application.

The preferred alkylthiophosphoric acids are represented by the following general formula:

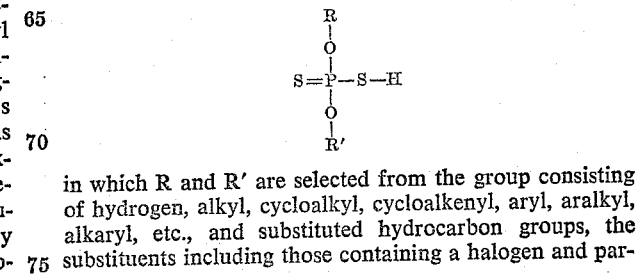

in which R and R' are selected from the group consisting of hydrogen, alkyl, cycloalkyl, cycloalkenyl, aryl, aralkyl, alkaryl, etc., and substituted hydrocarbon groups, the substituents including those containing a halogen and particularly chlorine and/or bromine, and/or groups containing oxygen, sulfur, nitrogen, phosphorus, etc.

In the above general formula, preferably at least one and still more preferably both of the R and R' groups are alkyl groups. Illustrative alkyl groups include methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, etc. Conveniently, these alkyl groups are introduced through the use of fatty alcohols and thus the alkyl radical may be selected from capryl, lauryl, myristyl, palmityl, stearyl, ceryl, etc. It is understood that the alkyl groups may be straight or branched chain, that the alkyl groups may be primary, secondary and/or tertiary substituents, and that R and R' may comprise the same or different alkyl groups.

Referring to the general formula, where R and/or R' comprises substituents containing an aryl group, the substituent may be selected from phenyl, tolyl, xylyl, ethylphenyl, diethylphenyl, propylphenyl, dipropylphenyl, butylphenyl, amylphenyl, hexylphenyl, heptylphenyl, octylphenyl, nonylphenyl, etc., benzyl, phenethyl, phenpropyl, phenbutyl, etc., naphthyl, methylnaphthyl, ethylnaphthyl, propylnaphthyl, butylnaphthyl, etc., naphthylmethyl, naphthylethyl, naphthylpropyl, naphthylbutyl, etc. When the substituent comprises a cycloalkyl group, it may be selected from cyclohexyl, methylcyclohexyl, ethylcyclohexyl, propylcyclohexyl, butylcyclohexyl, etc., cyclohexylmethyl, cyclohexylethyl, cyclohexylpropyl, cyclohexylbutyl, etc. When the substituent comprises a halogen-containing radical, it may be selected from p-chlorophenyl, m-chlorophenyl, o-chlorophenyl, p-bromophenyl, m-bromophenyl, o-bromophenyl, o,p-dichlorophenyl, trichlorophenyl, tetrachlorophenyl, pentachlorophenyl, o,p-dibromophenyl, tribromophenyl, tetrabromophenyl, etc., chloromethyl, chloroethyl, chloropropyl, chlorobutyl, etc., bromomethyl, bromoethyl, bromopropyl, bromobutyl, etc.

It is understood that R and R' may be the same or different substituent groups. Preferably both R and R' are radicals other than hydrogen and, still more preferably, are long-chain alkyl radicals, each containing from about five to twenty or more carbon atoms.

The alkylthiophosphoric acid is reacted with the condensation product in a proportion of one equivalent of thiophosphate per one basic equivalent. However, when the consdensation product is prepared from an unsaturated acid, the phosphate may be used in a proportion of phosphate equivalents which are equal up to the total of both basic equivalent and double bonds in the condensation product. In other words, the thiophosphate preferentially forms the addition salt with the tertiary nitrogen and any excess thiophosphate will add to the double bond in the condensation product. It is understood that applicant is not necessarily limited to the above explanation but it is believed that the reaction proceeds in this manner, and also that an excess of either reactant may be employed when desired.

The reaction is effected in any suitable manner. The reaction is exothermic and preferably is controlled by effecting the same in the presence of an inert solvent. Any suitable solvent may be employed, an aromatic hydrocarbon being particularly preferred. The aromatic hydrocarbons include benzene, toluene, xylene, ethylbenze, cumene, etc. Other solvents include saturated aliphatic esters, as ethyl acetate, amyl acetate, 2-ethylhexyl acetate, methyl propionate, methyl butyrate, ethyl butyrate, isopropyl butyrate, etc., saturated aliphatic nitriles as acetonitrile, propionitrile, etc., dioxane, nitrobenzene, chlorobenzene, chloroform, carbon tetrachloride, etc. The specific temperature of operation will depend upon whether a solvent is employed and, when used, upon the particular solvent. In general, the temperature may range from about 0° to about 200° F. and in some cases up to 300° F., although temperatures outside of this range may be employed, depending upon the specific reactants and solvents utilized. The time of reaction will range from two to twenty-four hours or more and generally from about three to about ten hours. Detailed description of specific methods for effecting the reactions are given in the examples appended to the present specifications.

The reaction normally is readily effected in the absence of a catalyst. In some cases, it is preferred to use a catalyst, and any suitable catalyst may be employed. Illustrative catalysts include anhydrous hydrogen chloride, p-toluene sulfonic acid, piperidine, etc.

The novel salt of the present invention is particularly useful as an additive to hydrocarbon oil and still more particularly to lubricating oil. In the latter oil, the salt serves a number of important functions such as oxidation inhibitor (peroxide decomposer), bearing corrosion inhibitor, ring antiplugging additive, extreme pressure additive, pour point depressant, viscosity index improver, detergent, etc.

When used as an additive to gasoline, the salt serves to prevent fouling of internal parts of the engine, as an oxidation inhibitor, corrosion inhibitor, etc. When used as an additive to oil heavier than gasoline and particularly fuel oil, diesel oil, marine oil, transformer oil, turbine oil, rolling oil, slushing oil, etc., which may be of petroleum origin or synthetically prepared, the salt serves to improve the oil in one or more ways including retarding and/or preventing sediment and/or sludge formation, dispersion of sediment when formed, retarding or preventing discoloration, oxidation and corrosion inhibitor, etc.

The salt generally is recovered as a viscous liquid or solid. It may be marketed as such or as a solution in a suitable solvent including, for example, saturated paraffinic hydrocarbons including pentane, hexane, heptane, octane, etc., aromatic hydrocarbons including benzene, toluene, xylene, cumene, etc., alcohols, ketones, etc.

The concentration of salt to be used as an additive will depend upon the particular organic substrate in which it is to be employed. In general, the additive will be used in a concentration of from about 0.001% to about 15% by weight or more, and more specifically in a concentration of from about 0.01% to about 2% by weight of the substrate. The additive is incorporated in the substrate in any suitable manner and preferably the mixture is suitably agitated or otherwise mixed in order to obtain intimate admixing of the additive and the substrate.

The following examples are introduced to illustrate further the novelty and utility of the present invention but not with the intention of unduly limiting the same.

EXAMPLE I

The compound of this example is O-capryl, O-hexyl dithiophosphoric acid salt of the condensation product of N-tallow-diethanolamine (Ethomeen T/12) with maleic anhydride. The dialkyl dithiophosphoric acid was prepared by the reaction of four moles each of capryl alcohol and methylisobutyl carbinol with two moles of phosphorus pentasulfide at 175° F. When the evolution of hydrogen sulfide subsided, the product was filtered. The resulting acid was analyzed and found to have a total mole equivalent weight of 370.5.

177.5 grams of Ethomeen T/12 (0.5 mole) were refluxed in 200 grams of xylene with 49 grams of maleic anhydride (0.5 mole) for a period of eleven hours. 8.5 cc. of water were collected. 110 grams (0.25 mole) of the condensation product then were reacted with 92.5 grams (0.25 mole) of the O-capryl, O-hexyl dithiophosphoric acid. The reaction is exothermic. The mixture then was warmed to 107° F. and the product further heated on a steam bath at 195° F. for four fours. The benzene solvent was removed by heating on a steam bath under vacuum. The resultant salt was recovered as a brown-tan heavy liquid, and had an index of refraction $n_D^{20}$ of 1.4953.

EXAMPLE II

As hereinbefore set forth, the novel compound of the present invention is especially useful as an additive in oil and particularly lubricating oil. This example illustrates runs conducted in a Lauson engine. In this series of tests, the runs were continued for 115 hours, using a jacket temperature of 210° F. and an oil temperature of 280° F. A typical commercial paraffinic solvent-extracted lubricating oil was used. Pertinent results of these runs are reported in the following table.

*Table I*

| Run No. | 1 | 2 |
|---|---|---|
| Additive | None | 0.5% by weight of Example I product. |
| Bearing weight loss, grams | 2.5189 | 0.0069. |
| Oil consumption, ml./hr | 6.14 | 5.7. |

It will be noted that the novel compound served to considerably reduce bearing weight loss, which illustrates the corrosion inhibitor properties of the salt.

EXAMPLE III

The novel compound of this example is the diisoamyl dithiophosphoric acid salt of a polymer formed by condensing and reacting equal mole proportions of hydrogenated tallow amine (Armeen HTD) and epichlorohydrin. It will be noted that the tallow amine is a mixture of primary amines predominating in sixteen to eighteen carbon atoms per alkyl group. The reaction was effected by first forming a solution of two moles of epichlorohydrin in 600 cc. of a solvent mixture comprising 400 cc. of xylene and 200 cc. of 2-propanol. A separate solution of two moles of Armeen HTD was prepared in an equal volume of xylene. One mole of the latter solution was added gradually to the epichlorohydrin solution, with stirring and heating at 130–140° F. for a period of 2.5 hours. Then another mole of Armeen HTD was added gradually to the reaction mixture, stirred and reacted at 175° F. for 2.5 hours. One mole of sodium hydroxide then was added with stirring and heating at 185°–195° F. for 3.5 hours, after which another mole of sodium hydroxide was added and the mixture stirred and reacted at 185°–195° F. for one hour. Following completion of the reaction, the mixture was cooled, filtered, and the filtrate then was distilled under vacuum to remove the alcohol and xylene.

31.9 grams (0.1 phosphate equivalent) of diisoamyldithiophosphoric acid was reacted with 37.3 grams (0.1 basic equivalent) of the polymeric condensation product prepared in the above manner. The reaction was effected by heating, with stirring, for four hours on a steam bath (temperature of about 195° F.). The resulting salt was recovered as reddish brown gel, having an index of refraction $n_D^{20}$ of 1.4975.

EXAMPLE IV

The novel compound prepared as described in Example III was evaluated in a Lauson engine, using a jacket temperature of 210° F. and an oil temperature of 280° F. A typical commercial paraffinic solvent-extracted lubricating oil was used. The runs were continued for 115 hours.

*Table II*

| Run No. | 3 | 4 |
|---|---|---|
| Additive | None | 0.5% by weight of Example III product. |
| Rations (average) piston | 1 8 | 8.5.[1] |
| Oil ring-plugging, percent | 5 | 0. |
| Bearing weight loss, grams | 2.9021 | 0.4160. |
| Oil consumption, ml./hr | 6.03 | 4.65. |

[1] 10=clean, 0=dirty.

Here again only pertinent data have been included in the table. It will be noted that the salt was effective in reducing corrosion and oil consumption and in maintaining the engine parts clean. This illustrates the properties of the salt as a bearing corrosion inhibitor and oxidation inhibitor.

EXAMPLE V

The compound of this example is the O-stearyl, O-capryl dithiophosphoric acid salt of the condensation product prepared in the manner described in Example I. The dialkyl dithiophosphoric acid was prepared by reacting one mole of stearyl alcohol and one mole of capryl alcohol with 0.5 mole of phosphorus pentasulfide at 165° F. The product was filtered and analyzed. It was found to have an acidic mole equivalent of 593, which is equivalent to 85.5% yield.

148.25 grams (0.25 mole) of the O-stearyl, O-capryl dithiophosphoric acid was reacted with 110 grams (0.25 mole) of the condensation product prepared as described in Example I, in the presence of benzene as a solvent. The mixture was reacted on a steam bath (temperature of 195° F.) for three hours, then was distilled under oil pump vacuum at 275° F. for ten minutes to remove the benzene solvent, and finally was heated and reacted on a steam bath for more than forty-eight hours. The product was analyzed and had an average acid number of 3.7 and a mole combining weight of 1515.

EXAMPLE VI

The compound of this example is the distearyl dithiophosphoric acid salt of the mixed polymeric condensation product of ethyldiethanolamine and Ethomeen T/12 with maleic anhydride. The polymeric condensation product was prepared by reacting 13.3 grams (0.1 basic equivalent) of ethyldiethanolamine and 35.5 grams (0.1 basic equivalent) of Ethomeen T/12 with 19.6 grams (0.2 acidic equivalent) of maleic anhydride in solution in 200 grams of xylene. The reactants were refluxed and 3.1 cc. of water were collected. 66.7 grams of distearyl dithiophosphoric acid were added to the xylene solution and reacted with evolution of heat. Xylene was removed by distillation under vacuum. The product then was prepared as a stock solution of 50% by weight in a commercial lubricating oil.

EXAMPLE VII

The compound of this example is the distearyl dithiophosphoric acid salt of the condensation product of Ethomeen T/12 and itaconic acid. The compound was prepared by reacting 71 grams (0.2 mole) of Ethomeen T/12 dissolved in toluene with 26 grams (0.2 mole) of itaconic acid. The mixture was refluxed and 5.3 cc. of water was collected. The polymeric reaction product was then distilled on a steam bath to remove the toluene solvent. 133.4 grams (0.2 mole) of distearyl dithiophosphoric acid then was reacted with the condensation product. The reaction was exothermic, the product becoming viscous at the first stage of salt formation, but later became more liquid as the temperature increased.

EXAMPLE VIII

The salt of this example is the mixed mono- and diisooctyl monothiophosphate salt of a copolymer prepared by reacting lauryl methacrylate and beta-diethylaminoethyl methacrylate. The copolymer is prepared by copolymerizing lauryl methacrylate and diethylaminoethyl methacrylate in concentrations to yield a product having 80% by weight of lauryl methacrylate and 20% by weight of diethylaminoethyl methacrylate. The polymerization is effected by heating the reactants at about 140° F. for about eighteen hours, with vigorous stirring in the presence of benzyl peroxide catalyst. The product is recovered as a viscous yellow liquid.

47.5 grams of a copolymer (0.01 basic equivalent) prepared in substantially the same manner as described above, was reacted with 3.19 grams of diisoamyl dithiophosphoric acid (0.01 acidic equivalent). The salt was heated for five hours on the steam bath. The product is a heavy amber oil, having a refractive index $n_D^{20}$ of 1.4782.

I claim as my invention:

1. An alkyldithiophosphoric acid salt formed by the addition reaction of an alkyldithiophosphoric acid to a tertiary nitrogen atom of a polymeric reaction product containing said tertiary nitrogen atom in a proportion of at least one equivalent of said acid per one basic equivalent of said product, said polymeric reaction product being selected from the group consisting of (1) the condensation product of from one to two mole proportions of an N-aliphatic-dialkanol amine in which the aliphatic group attached to the nitrogen atom contains from 1 to 50 carbon atoms with one mole proportion of a polycarboxylic acid, (2) the reaction product of equimolar proportions of an epihalohydrin and an amine selected from the group consisting of primary and secondary alkyl amines, and (3) the reaction product of an olefinic compound having a polymerizable ethylenic linkage and an olefinic compound having a polymerizable ethylenic linkage and a basic nitrogen atom.

2. The compound of claim 1 further characterized in that said polymeric reaction product is prepared by the reaction of an olefinic compound having a polymerizable ethylenic linkage and an olefinic compound having a polymerizable ethylenic linkage and a basic nitrogen atom.

3. An alkyldithiophosphoric acid salt formed by the addition reaction of an alkyldithiophosphoric acid to a tertiary nitrogen atom of a polymeric reaction product containing said tertiary nitrogen atom in a proportion of at least one equivalent of said acid per one basic equivalent of said product, said polymeric reaction product being the condensation product of from one to two mole proportions of an N-aliphatic-dialkanol amine in which the aliphatic group attached to the nitrogen atom contains from 1 to 50 carbon atoms with one mole proportion of a polycarboxylic acid.

4. An alkyldithiophosphoric acid salt formed by the addition reaction of an alkyldithiophosphoric acid to a tertiary nitrogen atom of a polymeric reaction product containing said tertiary nitrogen atom in a proportion of at least one equivalent of said acid per one basic equivalent of said product, said polymeric reaction product being the condensation product of from one to two mole proportions of N-tallow-diethanolamine with one mole proportion of maleic acid.

5. An alkyldithiophosphoric acid salt formed by the addition reaction of an alkyldithiophosphoric acid to a tertiary nitrogen atom of a polymeric reaction product containing said tertiary nitrogen atom in a proportion of at least one equivalent of said acid per one basic equivalent of said product, said polymeric reaction product being the condensation product of from one to two mole proportions of N-tallow-diethanolamine with one mole prportion of maleic anhydride.

6. An alkyldithiophosphoric acid salt formed by the addition reaction of an alkyldithiophosphoric acid to a tertiary nitrogen atom of a polymeric reaction product containing said tertiary nitrogen atom in a proportion of at least one equivalent of said acid per one basic equivalent of said product, said polymeric reaction product being the reaction product of equimolar proportions of an epihalohydrin and an amine selected from the group consisting of primary and secondary alkyl amines.

7. An alkyldithiophosphoric acid salt formed by the addition reaction of an alkyldithiophosphoric acid to a tertiary nitrogen atom of a polymeric reaction product containing said tertiary nitrogen atom in a proportion of at least one equivalent of said acid per one basic equivalent of said product, said polymeric reaction product being the reaction product of equimolar proportions of epichlorohydrin and N-tallow amine.

8. An alkyldithiophosphoric acid salt formed by the addition reaction of an alkyldithiophosphoric acid to a tertiary nitrogen atom of a polymeric reaction product containing said tertiary nitrogen atom in a proportion of at least one equivalent of said acid per one basic equivalent of said product, said polymeric reaction product being the reaction product of lauryl methacrylate and beta-diethylaminoethyl methacrylate.

References Cited in the file of this patent

UNITED STATES PATENTS

| | | |
|---|---|---|
| 2,409,344 | Davis | Oct. 15, 1946 |
| 2,497,638 | Fon Toy | Feb. 14, 1950 |
| 2,565,921 | Hook et al. | Aug. 28, 1951 |
| 2,578,652 | Cassaday | Dec. 18, 1951 |
| 2,586,656 | Hook et al. | Feb. 19, 1952 |
| 2,662,055 | Towne | Dec. 8, 1953 |
| 2,689,220 | Mulvany | Sept. 14, 1954 |
| 2,816,882 | Schiller | Dec. 17, 1957 |